United States Patent [19]
Mori

[11] Patent Number: 4,510,555
[45] Date of Patent: Apr. 9, 1985

[54] ORNAMENTAL LIGHTING DEVICE
[76] Inventor: Kei Mori, 3-16-3-501, Kaminoge, Setagaya-ku, Tokyo, Japan
[21] Appl. No.: 584,270
[22] Filed: Feb. 27, 1984
[51] Int. Cl.³ .............................................. F21V 7/04
[52] U.S. Cl. ..................... 362/32; 362/252; 362/307; 362/308; 362/311; 362/329; 362/330; 362/335; 362/339; 362/806
[58] Field of Search .............. 362/32, 252, 307, 308, 362/311, 329, 330, 335, 339, 806

[56] References Cited
U.S. PATENT DOCUMENTS
3,390,259  6/1968  Angier .......................... 362/812 X
4,141,058  2/1979  Mizohata et al. ............... 362/812 X
4,280,122  7/1981  McKinley et al. ............... 362/32 X
4,385,343  5/1983  Plumly ........................... 362/32 X Primary Examiner—Stephen J. Lechert, Jr.
Attorney, Agent, or Firm—Jordan and Hamburg

[57] ABSTRACT

An ornamental lighting device includes a plurality of optical fibers to which condensed light from a light source is distributed through a fiber optic cable. The optical fibers are arranged parallel to each other and held between a pair of light transmitting panels, which are rigidly mounted on a pedestal. Light propagating through the optical fibers is radiated through the light transmitting panels to the ambience. A plurality of such lighting devices may be arranged side by side and supplied by a common light source.

12 Claims, 5 Drawing Figures

ORNAMENTAL LIGHTING DEVICE

BACKGROUND OF THE INVENTION

The present invention relates to a lighting device and, more particularly, to an ornamental lighting device which is usable as a screen, for example.

The applicant has proposed in various forms a system in which the sunlight or any artificial light is condensed by a lens or the like into an optical cable to propagate therethrough to a desired location. The condensed sunlight or artificial light is desirable in constructing ornamental lighting devices which should preferably be free from generation of heat.

SUMMARY OF THE INVENTION

It is an object of the present invention to provide an ornamental lighting device which is capable of illuminating the ambience without generating heat.

It is another object of the present invention to provide a generally improved ornamental lighting device.

An ornamental lighting device for radiating condensed light which propagates through a fiber optic cable of the present invention comprises a pedestal, a plurality of optical fibers supported by the pedestal and optically coupled with the fiber optic cable to be supplied with the condensed light, retainers for retaining the optical fibers substantially parallel to each other and at a predetermined spacing from each other, and a pair of light transmitting panels mounted on the pedestal to have the parallel optical fibers therebetween.

The above and other objects, features and advantages of the present invention will become more apparent from the following detailed description taken with the accompanying drawing.

DESCRIPTION OF THE PREFERRED EMBODIMENTS

While the ornamental lighting device of the present invention is susceptible of numerous physical embodiments, depending upon the environment and requirements of use, substantial numbers of the herein shown and described embodiments have been made, tested and used, and all have performed in an eminently satisfactory manner.

Figure 1:
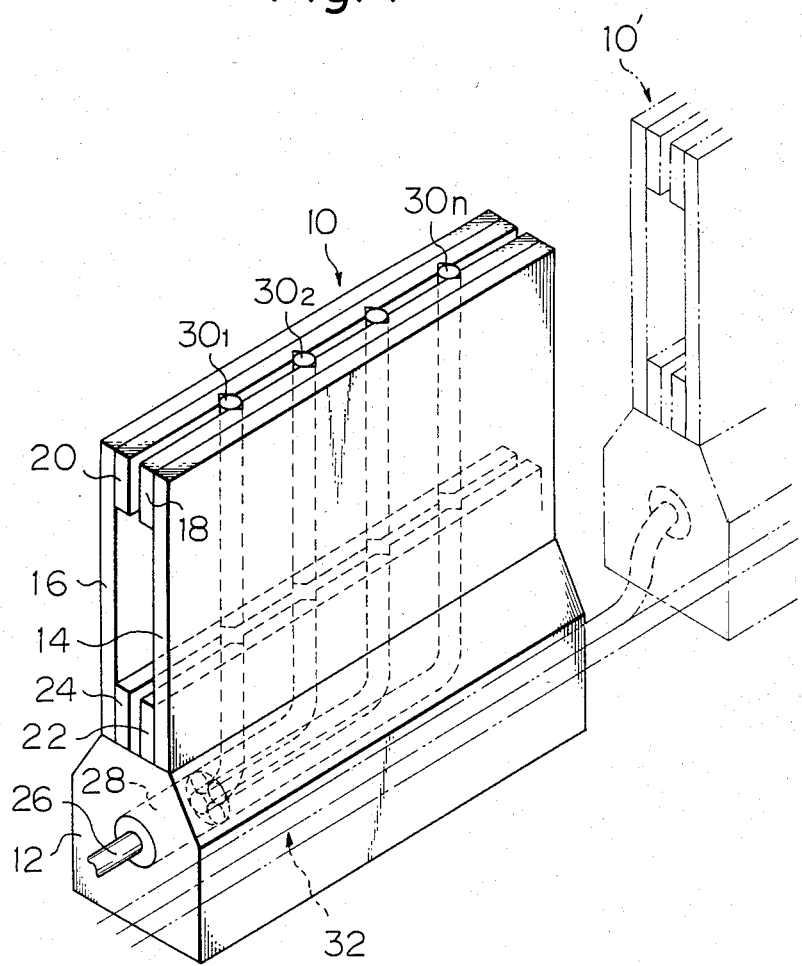
FIG. 1 is a perspective view of an ornamental lighting device embodying the present invention.

Referring to FIG. 1 of the drawing, an ornamental lighting device embodying the present invention is shown and generally designated by the reference numeral 10. The lighting device 10, in the form of a screen, comprises a pedestal 12 on top of which a pair of parallel light transmitting panels 14 and 16 are securely mounted. A pair of parallel upper retainer members 18 and 20 and a pair of parallel lower retainer members 22 and 24 are rigidly mounted on the facing inner surfaces of the light transmitting panels 14 and 16 in order to retain optical fibers as will be described.

An optical cable, or fiber optic cable, 26 extends from a light source (not shown) into an optical coupling 28 which is rigidly mounted in the pedestal 12. A plurality of optical fibers $30_1, 30_2, \ldots, 30_n$ extend out from the other end of the optical coupling 28 to form an array along the length of the pedestal 12. The upper retainers 18 and 20 and the lower retainers 22 and 24 are configured and arranged to support the optical fibers $30_1$–$30_n$ at spaced parallel locations along the length of the pedestal 12. The light source may supply either the sunlight or any artificial light insofar as the light is condensed light.

In the construction shown in FIG. 1, the light propagating through the fiber optic cable 26 is distributed by the optical coupling 28 into the parallel array of optical fibers $30_1$–$30_n$. While propagating through each of the optical fibers $30_1$–$30_n$, the light is radiated from the peripheral wall of the optical fiber to illuminate the ambience through the light tansmitting panels 14 and 16.

Mirrors may be mounted on those ends of the optical fibers $30_1$–$30_n$ which are remote from the optical coupling 28, so that the light may be more effectively radiated from the opposite surfaces of the lighting device, or luminous screen, 10. For additionally effective radiation of the light, a light transmitting material whose refractive index is larger than that of the optical fibers may be deposited on the surfaces of the optical fibers or, alternatively, recesses or grooves may be formed in the surfaces of the optical fibers. Such configurations of light conducting elements have been proposed in various forms by the applicant.

In the illustrative embodiment shown in FIG. 1, a plurality of luminous screens may be arranged side by side as represented by the screen 10 and a second screen 10'. In this case, the pedestal 12 of the screen 10 is formed with a duct 32 therethroughout in order to allow the condensed light to reach the adjacent screen 10' as well.

While the optical fibers $30_1$–$30_n$ in the illustrative embodiment extend substantially vertically in parallel with each other, they may be arranged to extend substantially horizontally in between the light transmitting panel 14 and 16. If desired, each optical fiber may be bent at several points between the panels 14 and 16. It should be noted that passing the fiber optic cable 26 through the pedestal 12 is not essential in accordance with the present invention.

Figure 2:
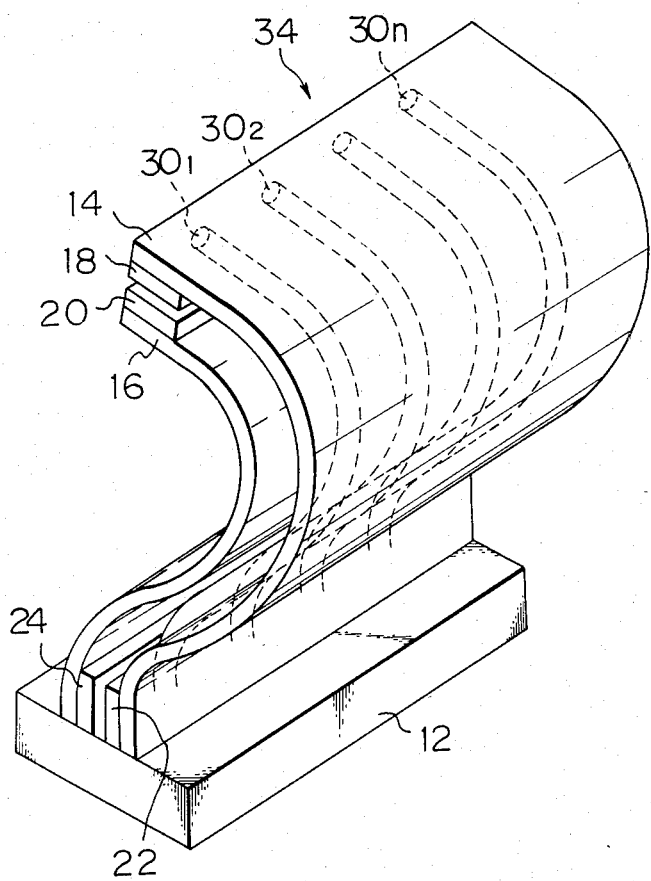
FIG. 2 is a perspective view of a modification to the lighting device shown in FIG. 1.

A modification to the lighting device shown in FIG. 1 is shown in FIG. 2. In FIG. 2, structural elements common or similar to those shown in FIG. 1 are designated by like reference numerals and details thereof will not be described for simplicity. As shown, the modified lighting device, or screen, 34 has a generally curved configuration, that is, the light transmitting panels 14 and 16 are curved while sandwiching correspondingly curved optical fibers $30_1$–$30_n$ therebetween.

Figures 3A, 3B:
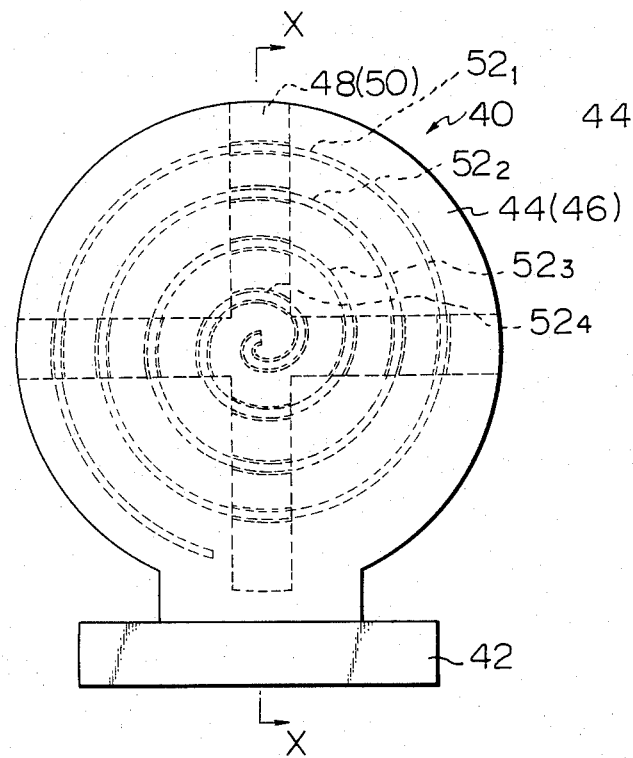
FIG. 3A is a front view of a second embodiment of the present invention.
FIG. 3B is a section taken along line X—X of FIG. 3A.

Referring to FIGS. 3A and 3B, another embodiment of the present invention is shown. The lighting device or screen, generally 40, has a pedestal 42 on which a pair of generally circular panels 44 and 46 made of a light transmitting material are mounted in parallel with each other. A cruciform retainer member 48 if rigidly mounted on the inner surface of the panel 44, and a cruciform retainer member 50 on the inner surface of the panel 46. A plurality of optical fibers $52_1$–$52_n$ are so interconnected and configured in between the panels 44 and 46 as to define a generally spiral light conduction path. The spiral optical fiber member is firmly fixed in position by the coactive retainer members 48 and 50.

Figure 4:
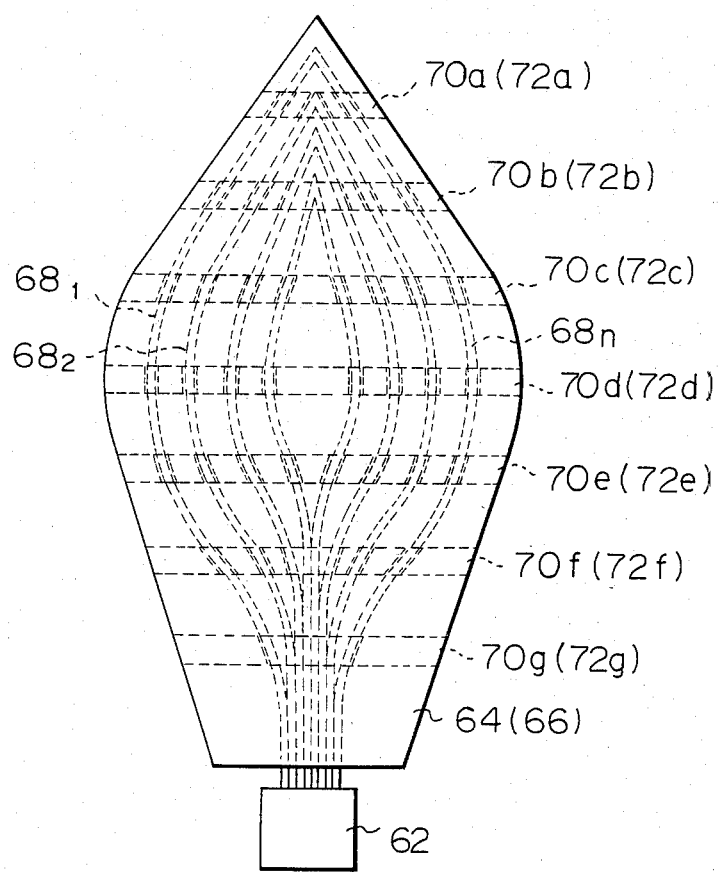
FIG. 4 is a front view of a third embodiment of the present invention.

Still another embodiment of the present invention is shown in FIG. 4. The lighting device generally designated by the reference numeral 60 is constructed to emit light from one of opposite surfaces thereof. The screen 60 having such a construction may find application as a halo. A pedestal 62 supports a pair of light transmitting panels 64 and 66 (only 64 is visible). A plurality of optical fibers $68_1$–$68_n$ are held between the opposite panels 64 and 66 and retained by retainer members 70a–70g and retainer members 72a–72g (only 70a–70g are shown), which are mounted on the panels 64 and 66 respectively. As shown, the optical fibers $68_1$–$68_n$ are shaped in substantially oblong loops each of which is substantially symmetrical with respect to a vertical which passes through the pedestal 62.

In the screen configuration shown in FIG. 4, the panel 66 at the back of the screen 60 may be provided with a mirror surface in order to reflect part of the light which issues from the optical fibers toward the back of the screen.

It will be needless to mention that the configurations of the light transmitting panels shown and described are only illustrative and may be replaced with any other desired one.

In summary, it will be seen that the present invention provides an ornamental lighting device which effectively illuminates the ambience without generating undesirable heat.

Various modifications will become possible for those skilled in the art after receiving the teachings of the present disclosure without departing from the scope thereof. For example, the mirror surface discussed in conjunction with the embodiment of FIG. 4 is similarly applicable to the other embodiments and may even be provided with a suitable pattern thereon. To omit the fiber retainer members in any of the embodiments described, one or both of the light transmitting panels may be formed with grooves for receiving the optical fibers therein. However, in the case where the optical fibers are individually recessed for light radiation as previously mentioned, the grooves in the panels will cause the light to leak when engaged by the recessed optical fiber walls. Such leakage may be eliminated by designing the refractive index of the panels smaller than that of the optical fibers.

What is claimed is:

1. An ornamental lighting device for radiating condensed light which propagates through a fiber optic cable, comprising:
   a pedestal;
   a plurality of optical fibers supported by said pedestal and optically coupled with the fiber optic cable to be supplied with the condensed light;
   retainer means for retaining said optical fibers substantially parallel to each other and at a predetermining spacing from each other; and
   a pair of light transmitting panels mounted on the pedestal and mounting said retainer means to hold the parallel optical fibers in sandwich array between said light transmitting panels.

2. An ornamental lighting device as claimed in claim 1, in which the pedestal is formed with a duct therein, the fiber optic cable being optically coupled with the optical fibers through said duct.

3. An ornamental lighting device as claimed in claim 2, in which the duct extends throughout the pedestal, another fiber optic cable being passed through said duct to distribute light to another ornamental lighting device.

4. An ornamental lighting device as claimed in claim 1, in which the retainer means comprises at least two retainer members mounted on inner surfaces of the facing light transmitting panels.

5. An ornamental lighting device as claimed in claim 1, in which the retainer means comprises guide grooves formed in an inner surface of at least one of the light transmitting panels, the optical fibers being individually received in said guide grooves.

6. An ornamental lighting device as claimed in claim 1, in which an inner surface of one of the facing light transmitting panels is a mirror surface.

7. An ornamental lighting device as claimed in claim 1, in which each of the optical fibers is provided with light diffusing means for diffusing light which propagates through the optical fiber.

8. An ornamental lighting device as claimed in claim 7, in which the light diffusing means comprises a light diffusing material deposited on the optical fiber and having a refractive index which is larger than a refractive index of the optical fiber.

9. An ornamental lighting device as claimed in claim 7, in which the light diffusing means comprises grooves formed in a surface of the optical fiber.

10. An ornamental lighting device for radiating condensed light which propagates through a fiber optic cable, comprising:
    a pedestal;
    a single optical fiber supported by said pedestal and optically coupled with the fiber optic cable to be supplied with the condensed light;
    retainer means for retaining said optical fiber in a spiral form; and
    a pair of light transmitting panels mounted on the pedestal and mounting said retainer means to hold said optical fiber in sandwich array between said light transmitting panels.

11. An ornamental lighting device as claimed in claim 10, in which the retainer means comprises a pair of generally cruciform retainer members.

12. An ornamental lighting device for radiating condensed light which propagates through a fiber optical cable, comprising:
    a pedestal;
    a plurality of optical fibers supported by said pedestal and optically coupled with the fiber optic cable to be supplied with the condensed light;
    retainer means for retaining said optical fibers substantially in oblong loops each of which is substantially symmetrical with respect to a vertical which apsses through the pedestal;
    and
    a pair of light transmitting panels mounted on the pedestal and mounting said retainer means to hold the optical fibers in sandwich array between said light transmitting panels.

* * * * *